(12) United States Patent
Huot et al.

(10) Patent No.: US 10,922,506 B2
(45) Date of Patent: Feb. 16, 2021

(54) ILLUMINATION DEVICE FOR AN OPTICAL SYSTEM OF A READER APPARATUS

(71) Applicant: SICPA HOLDING SA, Prilly (CH)

(72) Inventors: François Huot, Pully (CH); Pablo Sempere, Bernex (CH); Todor Dinoev, Chavannes-près-Renens (CH); Nicola Duca, Monthey (CH)

(73) Assignee: SICPA HOLDING SA, Prilly (SE)

( * ) Notice: Subject to any disclaimer, the term of this patent is extended or adjusted under 35 U.S.C. 154(b) by 0 days.

(21) Appl. No.: 16/619,848

(22) PCT Filed: May 17, 2018

(86) PCT No.: PCT/EP2018/062927
§ 371 (c)(1),
(2) Date: Dec. 5, 2019

(87) PCT Pub. No.: WO2018/224283
PCT Pub. Date: Dec. 13, 2018

(65) Prior Publication Data
US 2020/0364423 A1    Nov. 19, 2020

(30) Foreign Application Priority Data
Jun. 6, 2017 (EP) .................................... 17174510

(51) Int. Cl.
*G06K 7/10*    (2006.01)
(52) U.S. Cl.
CPC ................. *G06K 7/10742* (2013.01)
(58) Field of Classification Search
CPC ................................ G06K 7/10742
USPC .......................................... 235/454
See application file for complete search history.

(56) References Cited

U.S. PATENT DOCUMENTS

| | | | | |
|---|---|---|---|---|
| 5,449,892 A * | 9/1995 | Yamada | ............. | G06K 7/10594 235/462.35 |
| 5,461,417 A * | 10/1995 | White | ................. | G01N 21/8806 348/131 |
| 5,585,616 A * | 12/1996 | Roxby | ................ | G06K 7/10722 235/454 |
| 5,600,116 A * | 2/1997 | Seo | ..................... | G06K 7/10851 235/454 |
| 6,275,256 B1 * | 8/2001 | Olczak | ................. | G02B 5/0284 250/495.1 |

(Continued)

*Primary Examiner* — Daniel A Hess
(74) *Attorney, Agent, or Firm* — Muncy, Geissler, Olds & Lowe, P.C.

(57) ABSTRACT

An illumination device for an optical system of a reader apparatus, comprising a light source (3) disposed concentrically around an annular hollow body (2), an external light reflector (5) for redirecting light to illuminate a zone at its distal end (5b), and a reflector element (8) with a mirror finish outer surface (8a). The internal wall (6) of the external light reflector (5) is made of reflective material, having a first portion (6a) with increasing cross sections from a proximal end (5a) to a first region (6b) with maximum cross section, and a second portion (6c) with decreasing cross sections from the first region (6b) to a second region (6d) with minimum cross section. The reflector element (8) is arranged in front of the light source (3) to redirect light towards the first portion (6a) of the external light reflector (5). The illumination device (1) achieves, in a reduced space, high optical efficiency and uniform illumination on the mark to read, avoiding specular reflection.

17 Claims, 10 Drawing Sheets

(56) References Cited

U.S. PATENT DOCUMENTS

| | | | |
|---|---|---|---|
| 6,598,797 B2* | 7/2003 | Lee | G06K 7/10732 |
| | | | 235/454 |
| 6,921,893 B1* | 7/2005 | Petschik | G01D 5/34715 |
| | | | 250/221 |
| 7,614,563 B1* | 11/2009 | Nunnink | G06K 7/10732 |
| | | | 235/462.42 |
| 7,874,487 B2* | 1/2011 | Nunnink | G06K 7/10732 |
| | | | 235/473 |
| 9,070,031 B2* | 6/2015 | Nunnink | G06K 7/10732 |
| 9,536,124 B1* | 1/2017 | Nunnink | G06K 7/10851 |
| 2005/0087601 A1* | 4/2005 | Gerst, III | G02B 6/0096 |
| | | | 235/455 |
| 2006/0131419 A1* | 6/2006 | Nunnink | G06K 7/10732 |
| | | | 235/472.02 |
| 2009/0084848 A1* | 4/2009 | Liu | G06K 7/10722 |
| | | | 235/455 |

* cited by examiner

ILLUMINATION DEVICE FOR AN OPTICAL SYSTEM OF A READER APPARATUS

FIELD

The present disclosure is comprised in the field of secure track and trace systems and, more specifically, in the field of devices for reading and/or authenticating a mark printed on an object, such as a luminescent marking printed with luminescent inks, wherein the mark can be a pattern, logo, 1D or 2D barcode, or any other symbol or identification code. In particular, the invention relates to optical and illumination devices used by mark readers to illuminate and capture the mark. The readers may be, for instance, handheld devices, optical scanners, or any reading equipment mounted on production/distribution lines.

BACKGROUND

Handheld readers are commonly used for scanning a marking on the surface of an item or object. The marking may be implemented as a linear barcode, a matrix barcode or any other pattern including identification data corresponding to the item. Frequently, a mark on a surface of an item is invisible or hardly visible like a pattern printed with luminescent ink (e.g. phosphorescent or fluorescent inks) and/or can be detected only under illumination with specific excitation light, in the UV (Ultra Violet), VIS (Visible) or IR (Infra-Red) regions of the spectrum convenient for causing the luminescent material of the mark to luminesce. For example, if the mark is a barcode of which ink is excited in the visible spectral range and luminesces in the IR spectral range, an efficient and homogeneous illumination is needed for saving power of the batteries of the handheld reader and because any modulation of the measured intensity due to inhomogeneous illumination can hamper the operation of reading the barcode. Moreover, even if the marking can be detected with visible light, its size may be small or it may include fine details of small scales so that said marking is difficult to read, which makes good illumination conditions necessary.

Conventional light sources for optical scanners comprise, among others, incandescent lamps, flash lamps and LEDs, emitting in the UV, visible or IR regions, typically for wavelengths from about 250 nm to about 1 μm. Conventional photodetectors for scanners are cameras of the CMOS or CCD type, photodiodes (single or arrays), phototransistor or photoresistance circuits, linear CMOS or CCD sensors.

A conventional optical scanner, either handheld or fixed, normally comprises a light source, which may include filters, for illuminating a zone on an item with appropriate light, a light guide illuminator (which may include focusing means) for appropriately delivering light from the light source to said zone, means for collecting light reflected from said zone and transmitting it back to a photodetector or image sensor, a processing unit for analyzing the signal delivered by the image sensor and detecting/reading or decoding data associated with a marking located within said zone, and a control unit for controlling the illumination source and the processing unit.

Other conventional readers detect luminescence light emitted by a mark, which has been excited by a light source. In this case, the luminescence light is transmitted through luminescence light filter(s) (i.e. emission filter(s)) to a photodetector or an image sensor. When the illuminated substrate is highly reflective and illumination is in a broad band having some cross-talk with the emission band (and emission detection starts before illumination completely ceased), then the reader must also be equipped with an excitation filter. Interferometric excitation filters may be used to reduce the specular reflections; however, these filters are difficult to design, very expensive and can substantially modify the illumination homogeneity pattern due to "blue shift" occurring at non-normal incidence on their surface.

A classical problem with optical scanners is to illuminate a zone, at a level of an item's reflective surface comprising a marking, homogeneously and with sufficient light intensity, so that the detector of the scanner is capable to read said marking from the reflected light, while minimizing stray light and avoiding "hot spots" or specular reflections on the illuminated surface which degrade the contrast and may cause severe image processing problems. The detection of the marking may also fail if the image sensor saturates. This problem is more acute when the mark is printed on curved reflective surfaces.

Some optical scanners use an optical system in which a good portion of light impinging onto the mark comes directly from the source without undergoing any reflection or refraction; however, such a configuration may suffer from strong specular reflections when the substrate favors it, which makes the reading of a mark difficult. For such a configuration, the likelihood to obtain specular reflection on a mark is high in the case of, for instance, a (Data Matrix) symbol printed on a cigarette pack wrapped with cellophane or a (Data Matrix) symbol printed directly on a substrate with highly reflective surface such as, for example, polished metallic substrate, glossy paper, metallized paper.

To address these problems, several patent documents propose specific illumination techniques. Document U.S. Pat. No. 6,352,204-B2 discloses illuminating a zone on an item at low incidence angle so as to minimize a "wash out effect" caused by shiny or irregular surfaces. However, there is a remaining problem with ambient light (i.e. stray light) which can hamper code reading.

Documents U.S. Pat. No. 7,357,326-B2, U.S. Pat. No. 7,370,802-B2 and U.S. Pat. No. 7,419,098-B2 disclose an illuminator having a nosepiece, in the shape of a truncated pyramid, for directly illuminating a zone on an item by placing the converging end of said nosepiece near said zone so that light from the light source reaches only the intended zone while being shielded from much of the ambient light. The opposite diverging end of the nosepiece receives light from the light source. However, this arrangement causes some problems with direct reflection of light, back to the image sensor, on the internal face of the nosepiece (even if this face may be an irregularly uneven reflective one so as to scatter light) and also generating possible "light spots" on the reflective surface of the item.

Other patent documents, such as US20060133757-A1 and U.S. Pat. No. 7,510,120-B2, disclose other implementations of handheld scanners or code readers with means for illuminating a reading region: however, even if in both cases direct reflections are reduced by using either diffuse illumination or low angle illumination, optical efficiency and compactness are clearly not optimized. Document US2012092131-A1 discloses an annular light guide illuminator that solves some of the above-explained problems, improving the detection of a marking by a scanner equipped with such illuminator. Said illuminator eliminates much of stray light coming from external sources or due to internal reflection, avoids the formation of light spots on the illuminated surface and enhances the contrast of the marking by improving homogeneity of the illumination. The annular light guide illuminator reduces back reflections as it is a source of diffuse light, providing homogeneous illumination of the sample and light uniformity. However, as a diffuse source it also has low optical efficiency due to light trapped in the light guide, which is a problem, particularly for handheld devices powered by batteries.

In case of scanners designed to read luminescent codes, the specular reflections are blocked to great extent by a luminescence filter. Reading luminescent codes with luminescence code scanners reduces the negative impact of specular reflections from highly reflective surfaces on the mark reading. The luminescence filter is also removing part of the ambient light possibly present on the mark and reduces effect of internal reflections.

A scanner/detector able to read luminescent markings provides illumination on the mark that is efficiently exciting luminescence in the ink and further detects the emitted luminescence using a (long-pass) luminescence filter. The filter is chosen to provide sufficient blocking for the illumination light and thus to any back reflected illumination (e.g. specular reflections from the surface of the mark or from the illumination structure itself) and assures sufficient transmission for the luminescence in order to obtain high contrast image of the luminescent mark even if printed on highly reflective substrates.

However, in some cases the sole use of luminescence filter is not enough to suppress completely the specular reflections from reflective surfaces. It is possible that the illumination has a small portion of spectrum that extends to the transmission band of the luminescence filter due specific requirements for the luminescence excitation spectra and due to typical broad emission spectra of used/available illumination LEDs. In this case interferometric or absorptive (short pass) excitation filters could be used to remove the unnecessary (long) wavelength portion of illumination spectra which then falls in the transmission band of the luminescence filters (i.e. cross-talk between excitation and detection channels). Such excitation filters allow reducing the specular reflections; however, as already mentioned, they are difficult to design, could be expensive and could substantially modify the illumination homogeneity pattern due to "blue shift" occurring at non-normal incidence on their surface.

A design is possible which can reduce specular reflections by directing the illumination rays in a way to avoid back reflections from highly reflective substrates to enter the detector and thus reach the image sensor. This is the case of oblique illumination. By using a specific design of the illumination described hereinafter specular reflections that would not be stopped by the fluorescence (luminescence) filter are reduced.

The proposed design also has high optical efficiency which is rarely addressed in prior art. High optical efficiency is required for luminescence hand held scanners in order to reduce consumption and increase time of operation.

Many of the illumination devices in the prior art fail to homogeneously illuminate the reading zone, and those achieving a certain degree of light uniformity required for reading a mark are bulky and not suitable to incorporate into a small handheld device or into a widget attached to a handheld device, such as a smartphone.

Therefore, there is a need in the art for an illumination device and/or an optical system for a reader apparatus (capable to read luminescent codes) that maximizes the optical efficiency, and thus the optical irradiance on the mark while at the same time maximizing the illumination homogeneity of the mark, and reduces specular reflections to acceptable level in order to allow efficient data reading in case the mark includes (encoded) data representation (e.g. 1D or 2D bar codes). Furthermore, there is a need to achieve those goals with an illumination device or an optical system that is as compact as possible.

SUMMARY

The present invention refers to an illumination device used by an optical system of a reader apparatus, such as a handheld device or an optical scanner. The illumination device solves the aforementioned problems of strong specular reflection from a surface which can saturate a light sensor and prevent reading of codes printed with absorbing inks, or reading luminescent codes (without requiring an excitation filter).

The present invention achieves also maximum optical efficiency and uniform illumination in addition to great reduction of specular reflection on the mark to be read. Moreover, these advantages are provided by a compact illumination device with a minimum volume, facilitating the coupling or attachment to handheld devices, such as smartphones and optical scanners.

The present invention, although particularly adapted for handheld readers of luminescent codes, can also be used on general readers (not necessarily handheld readers) and for reading codes not necessarily luminescent (e.g. detecting only reflected light).

The illumination device comprises an annular hollow body for receiving a light field acquisition device, a light source disposed externally around the annular hollow body, and an external light reflector having a proximal end and a distal end. The external light reflector is configured to guide light originating from the light source to illuminate a zone at the distal end.

The key components of the illumination device are the special configuration of the external light reflector and the incorporation of a reflector element with a mirror finish outer surface disposed in front of the light source. These two elements work in conjunction to synergistically achieve the mentioned technical advantages in a highly reduce volume.

The external light reflector is a hollow piece arranged concentrically to the annular hollow body and with an internal wall made of reflective material. The internal wall is a surface of revolution having a first portion with increasing cross sections along a central axis from the proximal end to a first region with maximum cross section; and a second portion with decreasing cross sections from the first region to a second region with minimum cross section. The projection of the first portion on the central axis is shorter than the projection of the second portion on the same axis. The inner surface of the distal end is preferably located within the second region of the internal wall.

The reflector element arranged in front of the light source is configured to redirect light originating from the light source towards the first portion of the internal wall of the external light reflector. The reflector element deviates rays that would, in its absence, propagate directly from the light source to the mark located at the distal end, thus being a potential source of hot spots in the image sensed if the sample favors specular reflection. These deviated rays are not simply lost but reflected onto the external light reflector which favors diffuse reflectance thus allowing a good portion of the light to reach the mark at the distal end, this way increasing efficiency with a good ray repartition, improving uniformity, and highly suppressing hotspots, as only a very small portion of rays impinging on a sample with high specular reflection would do it at angles that can be imaged by the main lens on the image sensor. This is achieved because no illumination LED rays are allowed to propagate directly (i.e. without undergoing reflective scattering on the specially designed external light reflector) to the sample.

The mirror finish outer surface of the reflector element may be implemented as a surface of revolution, preferably comprising one or more truncated conical surfaces. The reflector element may comprise an opaque layer, preferably made of a diffusive material, disposed on the distal end of the reflector element (i.e. on the side of the reflector element facing the scanned mark).

The illumination device may further comprise a transparent layer disposed perpendicular to the central axis between the external light reflector and the annular hollow body. The transparent layer is a transparent window to close the volume in which the light source (e.g. LEDs connected to a PCB) is arranged, to avoid contamination and humidity to reach the PCB with the LEDs and electronic circuitry.

According to an embodiment, the reflector element is attached to the outer surface of the annular hollow body. The reflector element is preferably arranged such that the minimum distance from the mirror finish outer surface to the light source (e.g. LED) is at least 0.5 mm to avoid using too tight mounting tolerances for the LEDs.

As for the materials employed to manufacture the several components of the illumination device, the mirror finish outer surface of the reflector element is preferably made of polished aluminum, polished silver or dense white plastic with metal coating on surface; the internal wall of the external light reflector may be made of a white plastic diffusive material or of a surface scattering metal with scattering properties (i.e. its BRDF "Bidirectional Reflectance Distribution Function") similar to that of the plastic light diffusive material (e.g. diffuse reflector which scatters more than 90% in a Lambertian distribution and having less than 10% of specular reflection); the annular hollow body is preferably made of a light absorbing material; and the transparent layer may be made of acrylic or polycarbonate.

In a preferred embodiment, the light source comprises a plurality of light emitting sources, preferably LEDs, arranged symmetrically around the annular hollow body. In an embodiment, the LEDs are connected to a ring-shaped PCB externally concentric to the annular hollow body.

A further aspect of the present invention refers to an optical system for reading a marking on an object. The optical system comprises any embodiment of the illumination device previously explained. In addition, the optical system incorporates optical means (i.e. a light field acquisition device) disposed inside the annular hollow body. In an embodiment the optical means comprises a main lens and an image sensor that captures the light received from the main lens. In an embodiment, the optical system is mounted on a widget attachable to a smartphone. According to an embodiment, the optical system also comprises a luminescence optical filter either absorptive or an interference one, to transmit the luminescence and prevent excitation light from the LEDs to reach the image sensor. Such filter is necessary for reading luminescent marks.

According to an additional aspect of the present invention, there is provided an apparatus for detecting a marking on an object. The apparatus includes the already mentioned optical system with the new illumination device, and a processor for analyzing the image captured by the optical system to detect a marking. The apparatus may be a handheld reader. In an embodiment, the handheld reader is a smartphone. In this case, the optical system is preferably mounted on a widget coupled to the smartphone. In another embodiment, the handheld reader is an optical scanner.

The present invention presents a further advantage regarding elimination of costly excitation filters in case of crosstalk region exists between excitation and emission intensity curves when reading luminescent markings. The illumination device of the present invention can be used for readers in which light detection and illumination are in about the same spectral band or for readers in which excitation light (illumination) is in one spectral band and detection of luminescence light is in another spectral band.

In the first case, readers using same spectral band for light detection and illumination, when the substrate or mark is diffusive (i.e. intensity level due to specular reflection of illumination light is low), it is possible to print a mark with absorptive inks and read marks printed with such inks. However, when the substrate is highly reflective (i.e. intensity level due to specular reflection of illumination light is high and can saturate the light sensor), the reflector element according to the present invention prevents direct reflection of illumination light on the mark toward the light sensor and thus, eliminates specular reflection. This is due to its internal wall which provides only "oblique" illumination of the mark (so that only diffuse reflection is detected by the light sensor) and thus, it is possible to read absorptive inks.

In the second case, readers using different spectral band for light detection and illumination, to read markings on highly reflective substrates it is possible to use luminescent inks, but the light sensor must be equipped with luminescence filter in order to prevent specular reflection of illumination light on the substrate (in case luminescence detection starts while there is still some illumination with excitation light) and thus prevent saturation of the light sensor. However, in this case, if there is some cross-talk region between the spectrum of excitation light and the spectrum of luminescence (emission) light, then it is necessary to add a costly excitation filter for attenuating wavelengths of excitation light that can pass the luminescence filter, in order to still have a detectable luminescence signal over a cross-talk signal. The above mentioned additional technical effect of the invention is that the oblique illumination provides for detection of only diffuse reflection from the marking, so that the reflected intensity in the cross-talk spectral region is lowered (as the part relating to specular reflection is strongly reduced) and allows measuring the luminescence light without using an excitation filter.

In some embodiments, the illumination device preferably uses visible light to excite luminescence, although other parts of the spectrum can be used, depending on the marking. The mark reading may be performed, for example, in the IR spectral range. In case of light absorption marks, requiring illumination and detection in the same spectral band, the required illumination spectrum is then defined by the light absorption properties of the marking.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION

Figure 1:
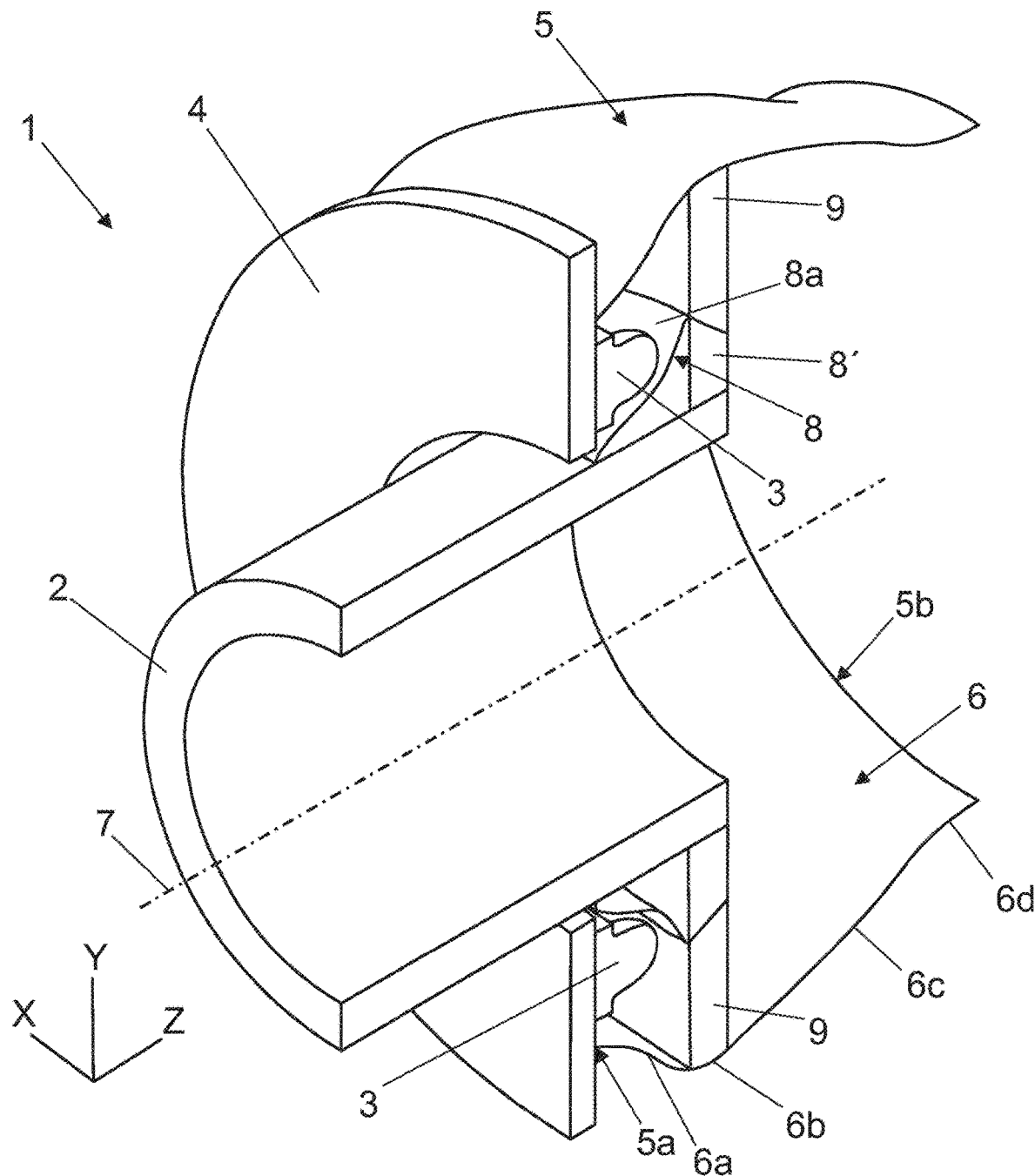
FIG. 1 represents a perspective view of the longitudinal section of the illumination device.

The present invention relates to an illumination device for an optical system of a reader apparatus. FIG. 1 shows, in a perspective view, the main components of the illumination device 1 according to a longitudinal section along central axis 7. The illumination device enables the reading and/or detection, by the optical system of a reader apparatus, of a luminescent mark or symbol printed on an item. Axis Z represents the longitudinal dimension, axis Y the vertical direction and axis X the depth of the illumination device 1.

As depicted in FIG. 1, the illumination device comprises an annular hollow body 2 configured to receive a light field acquisition device (optical capture means), a light source 3 for exciting the mark arranged externally around the annular hollow body 2, and an external light reflector 5 that guides light originating from the light source 3 to a zone at the distal end 5b of the external light reflector 5.

Figure 2:
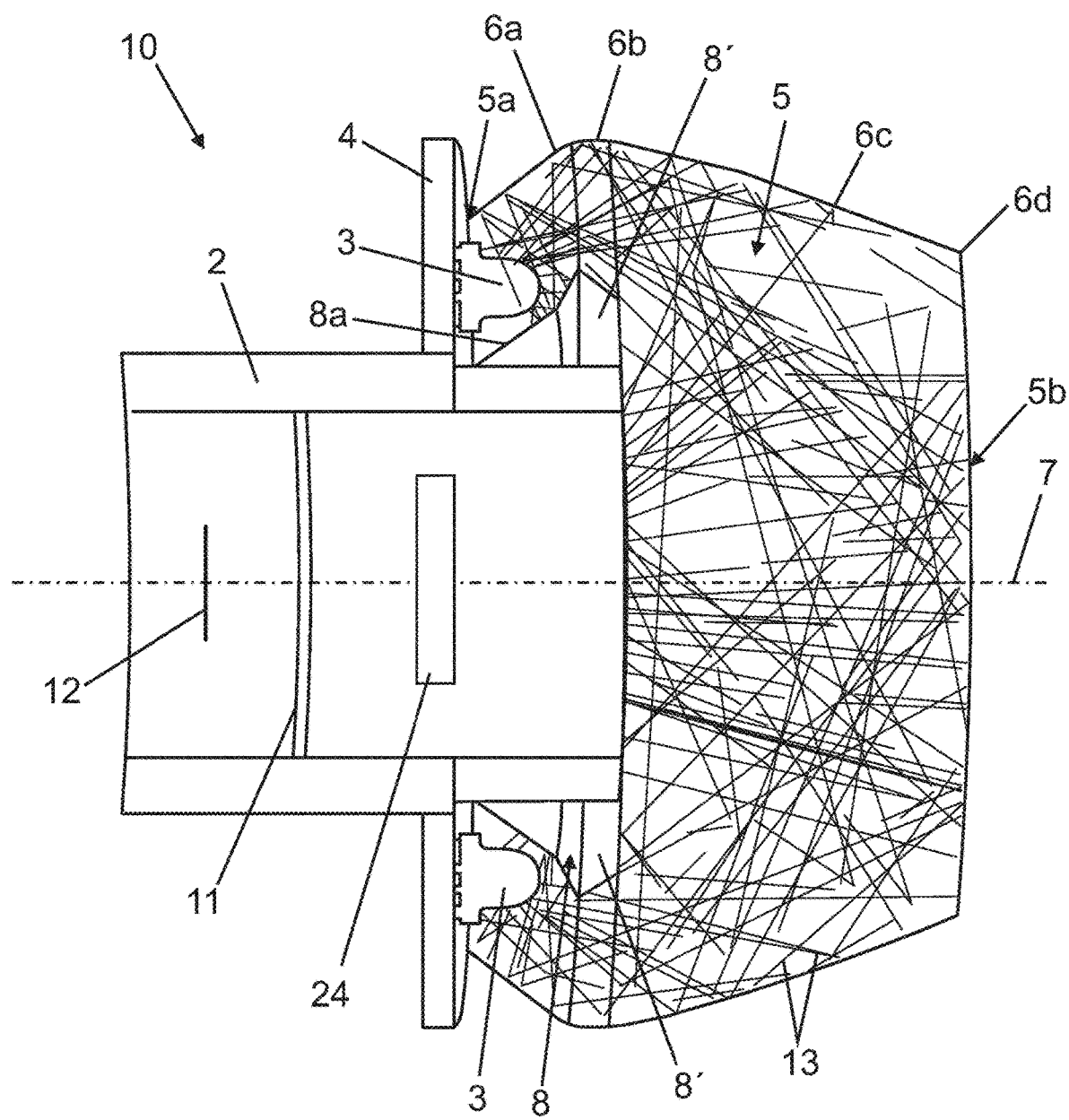
FIG. 2 depicts a sectional view of another example of embodiment of the illumination device including optical means.

FIG. 2 shows a sectional view of an optical system 10 comprising the illumination device 1 of FIG. 1. The optical system 10 further includes optical means; in particular, an image sensor 12 for acquiring an image of the mark and a main lens 11 disposed in front of the image sensor 12 to focus the light reflected from the mark onto the image sensor. In an embodiment, the illumination device 1 further includes a luminescence filter 24 disposed inside the annular hollow body 2, in front of the main lens 11. The luminescence filter 24 is particularly useful when the illumination device 1 is used in a luminescence reader (i.e. to read luminescent marks).

The external light reflector 5 is a hollow piece disposed concentrically to the annular hollow body 2. The internal wall 6 of the external light reflector 5 is made of reflective material to reflect the light (depicted as light rays 13) emitted from the light source 3, such as white plastic diffusive material or surface scattering metal to enhance diffusion of light. The special configuration and shape of the external light reflector 5 enhances the redirection of light rays onto the zone at distal end 5b, where the mark is to be placed, achieving a more efficient and homogeneous illumination of the mark.

The internal wall 6 of the external light reflector 5 is a surface of revolution with a specific shape. In a first portion 6a of the internal wall 6, the cross section progressively increases along the axis of revolution (central axis 7) from a proximal end 5a of the internal wall 6 of the external light reflector 5 to a first region 6b with maximum cross section. The length of the first region 6b along the central axis 7 may be very short, almost infinitesimal, up to a few millimeters. In a second portion 6c, the cross section of the internal wall 6 decreases continuously, reaching a second region 6d with minimum cross section. In the embodiment shown in FIG. 2, the second region 6d is infinitesimal and corresponds to the distal end 5b. Alternatively, the second region 6d with minimum cross section may extend a short distance (e.g. a few millimeters) up to the distal end 5b. The length of the first portion 6a, or its projection on the central axis 7, is shorter than the length or the second portion 6c, or its projection on the central axis 7. This configuration allows an efficient and homogeneous redirection of the light rays 13 originating from the light source to the zone at the distal end 5b in a minimum volume, keeping the device compact.

The illumination device 1 further comprises a reflector element 8, the outer surface 8a of which is mirror-finished (e.g. polished aluminum or polished silver) and is at least partly facing the light source 3 such that part of the light originating from the light source 3 is reflected back towards the first portion 6a of the internal wall 6 of the external light reflector 5. This way, light incident onto the mark placed at the distal end 5b does not impinge at angles such that a specular reflection from a flat mark or substrate could be imaged by the imaging system (main lens 11 and image sensor 12). This is because the light from the light source 3 does not travel directly up to the mark at angles and areas where a specular reflection would yield a hotspot in the imaging system, but is instead reflected and impinges on the mark/substrate at oblique angles. Thus, the present illumination device 1 avoids rays impinging onto the mark at angles which can yield hot spots in the imaging system.

According to an embodiment, the reflector element 8 comprises an opaque layer 8' on the distal end of the reflector element 8 (i.e. the side of the reflector element 8 closer to the distal end 5b of the illumination device 1). The opaque layer 8' is preferably made of light diffusive material (e.g. implemented as a diffusive white part). The opaque layer 8' is used to increase light homogeneity and remove specular reflections on the polished outer surface of the reflector element 8. In the embodiment of FIG. 2 the reflector element 8 and the layer 8' are coupled or fixed to the outer surface of the annular hollow body 2.

To increase security and prevent a user accidentally contacting the electronic circuit of the PCB 4 feeding the LEDs 3, a transparent layer 9 may be disposed perpendicular to the central axis 7, between the external light reflector 5 and the annular hollow body 2 (see FIG. 1). The transparent layer 9 is preferably arranged within the first region 6b with maximum cross section. This way, the transparent layer 9 is annular-shaped and can be easily manufactured and assembled in the device. In an embodiment, the transparent layer 9 is made of PMMA or polycarbonate.

Figure 3:
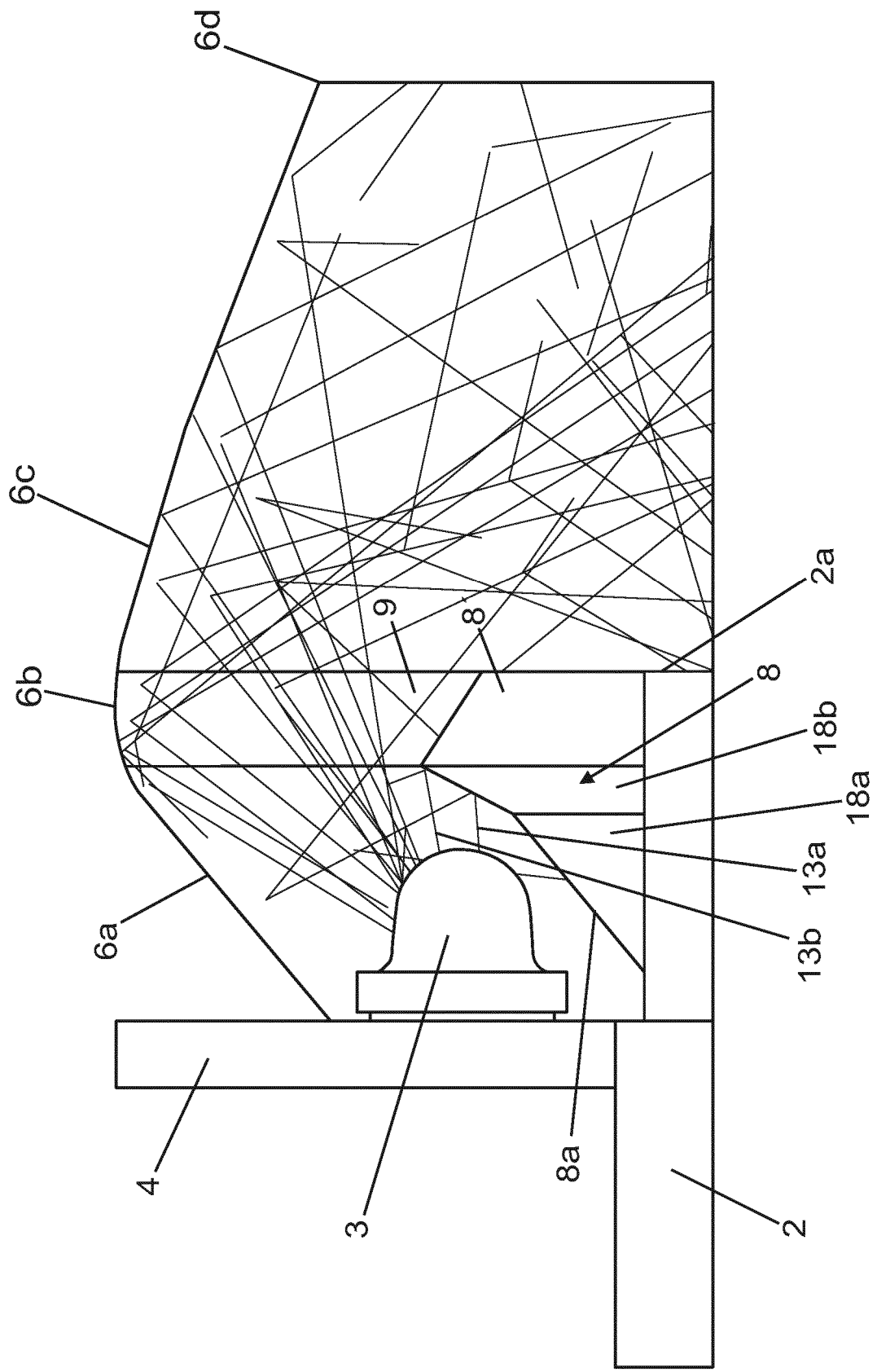
FIG. 3 depicts the reflector element of the illumination device shown on FIG. 2, reflecting light originating from the light source.

FIG. 3 illustrates a zoomed view of the reflector element 8, showing in more detail the redirection of light rays (13a, 13b) up to the first portion 6a of the internal wall 6. In this embodiment, the annular hollow body 2 is placed such that its distal end 2a falls next to or within the first region 6b of the external light reflector (5). In a preferred embodiment, the mirror finish outer surface 8a of the reflector element 8 is a surface of revolution arranged concentrically to the external light reflector 5. The reflector element 8 shown in FIG. 3 is formed by two consecutive truncated cones (18a, 18b), it can be funnel-shaped with internal wall contour (i.e. generatrix) changing linearly along central axis 7.

Figure 4:
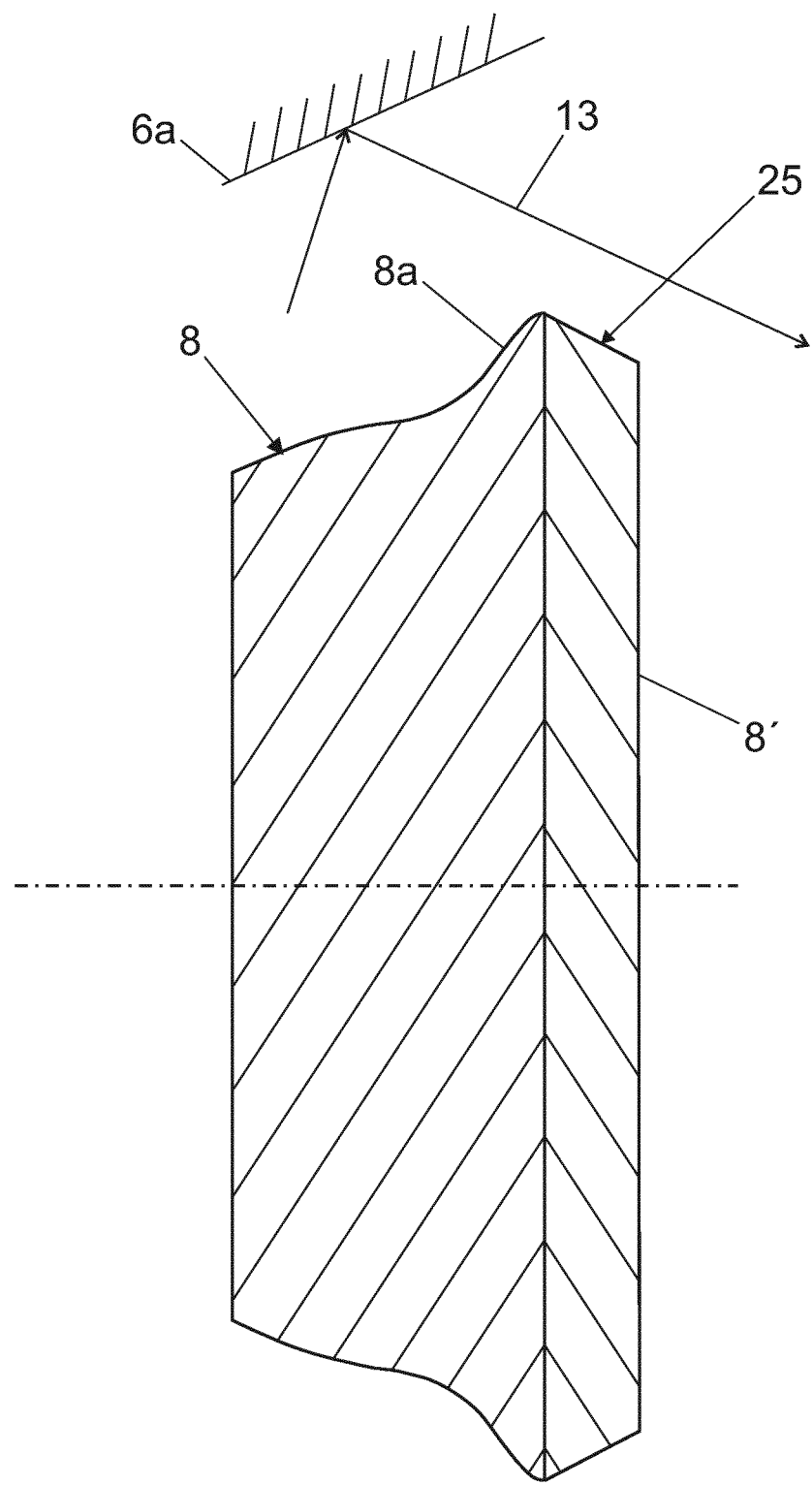
FIG. 4 illustrates another embodiment of the reflector element, separate from the illumination device.

FIG. 4 depicts another embodiment of the reflector element 8, with internal wall contour presenting generatrix shape having quadratic, cubic or in general polynomial dependency along central axis 7 (i.e. not only straight conical walls).

Moreover, the figure shows the specific design of the light scattering layer 8' which prevents specular light reflection on the metallic back of the reflector element 8 and thus participates in the homogenization of the illumination and helps increasing its efficiency. The thickness and bevel angle 25 of the layer 8' can be optimized to avoid shadowing of light rays 13 which are reflected from the first portion 6a of the internal wall 6 and are directed to distal end 5b of the illumination device.

Figure 5:
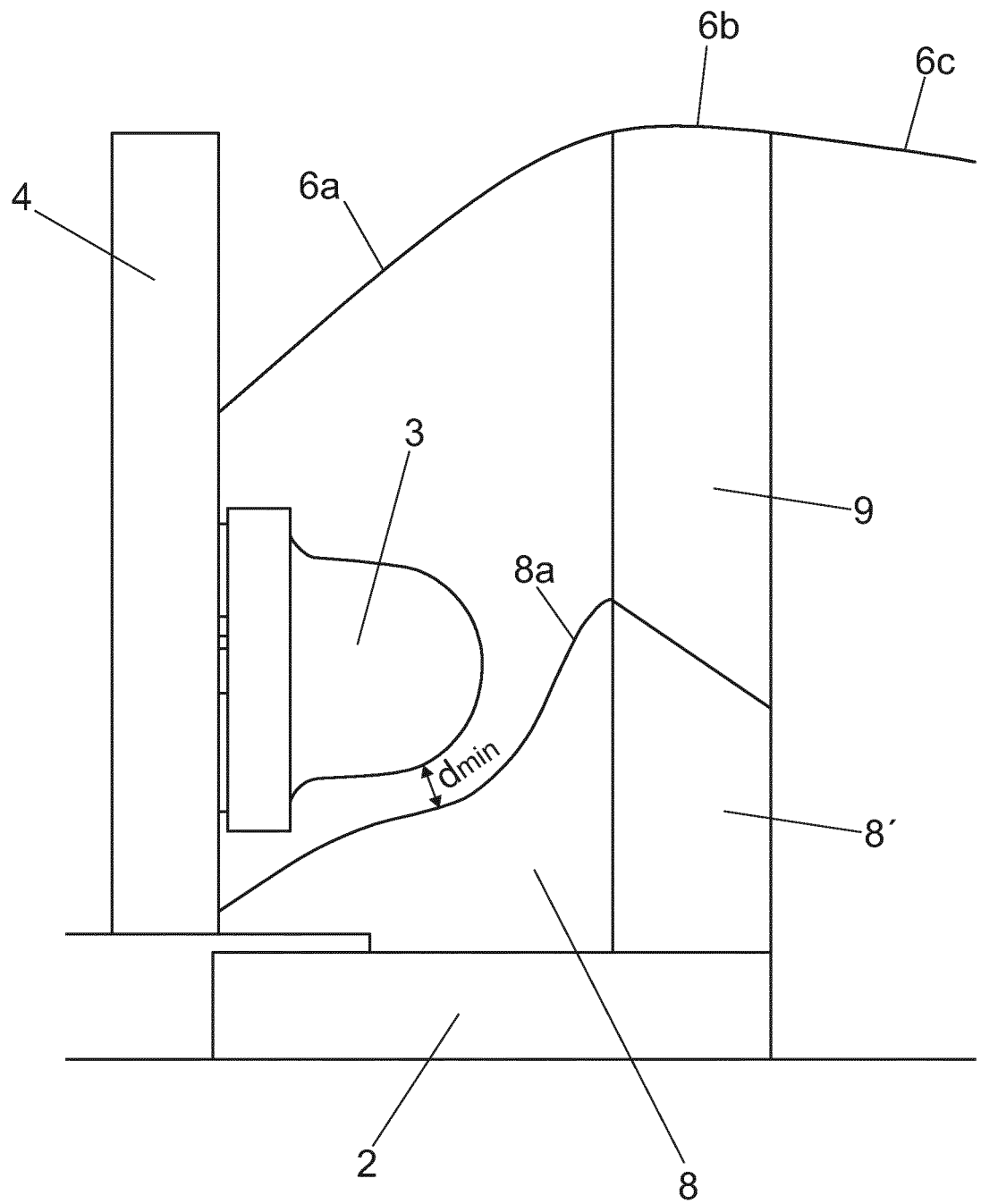
FIG. 5 represents another exemplary embodiment of the reflector element and the external light reflector, with a curved longitudinal section.
Figure 6:
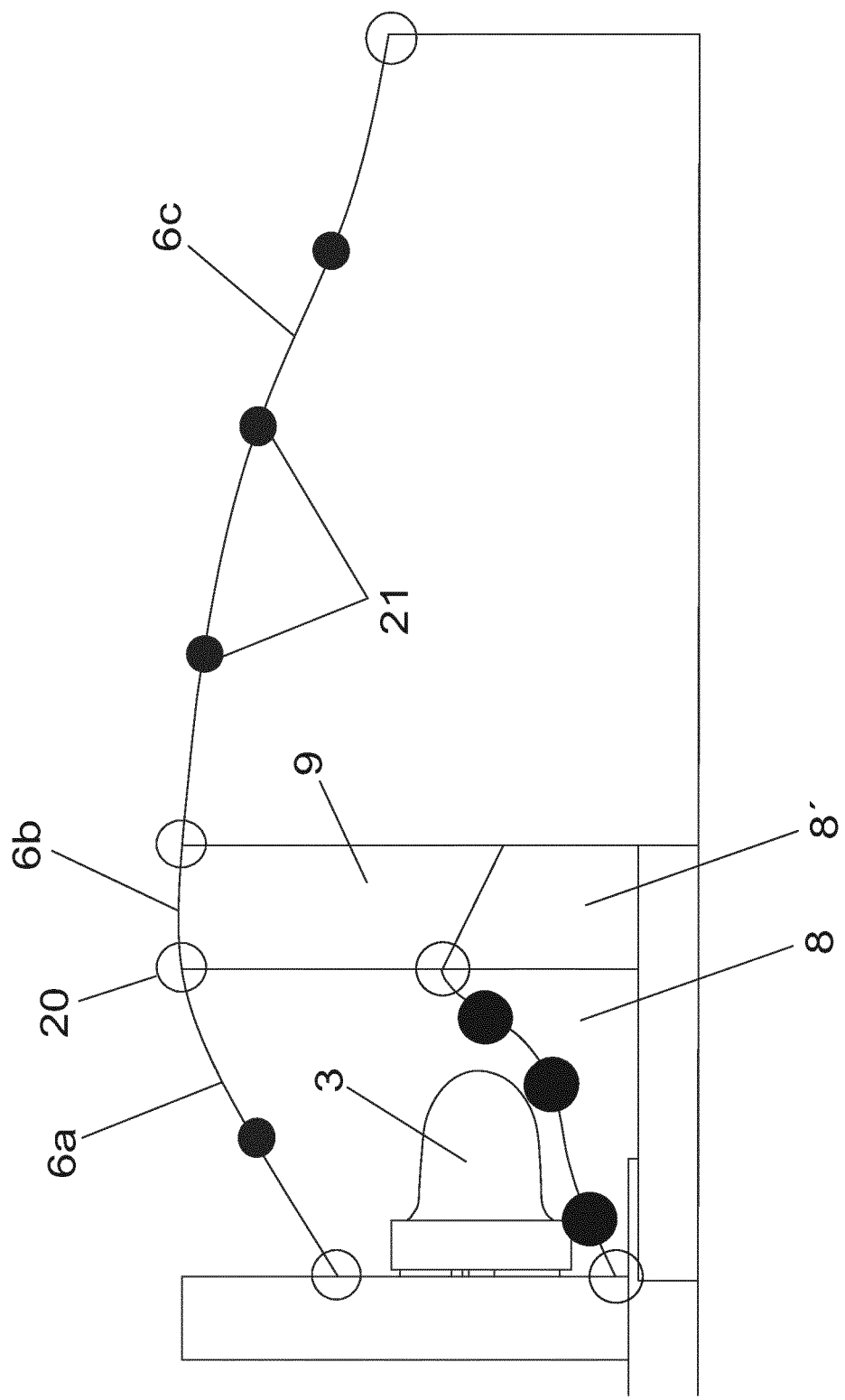
FIG. 6 depicts fixed and variable points of the reflector element and the external light reflector used in a computer-assisted optimization process.

FIG. 5 depicts another exemplary embodiment of the illumination device 1, in which the contour of the longitudinal section of the external light reflector 5 and the reflector element 8 is curved (and not linear, as in the embodiment of FIG. 3). In this particular case, the increase of cross sections of the first portion 6a and of the mirror finish outer surface 8a is not linear (the cross sections of the second portion 6c are also not linearly decreasing). The shape of the curved section of the external light reflector 5 and/or the reflector element 8 may be obtained using a computer-assisted optimization process including a ray model of light. The optimization process may be performed, as shown in the example of FIG. 6, by establishing some fixed points 20 of the contour and computing additional variable points 21 of the contour that optimize the reflection and light uniformity at the distal end 5b.

Figure 7:
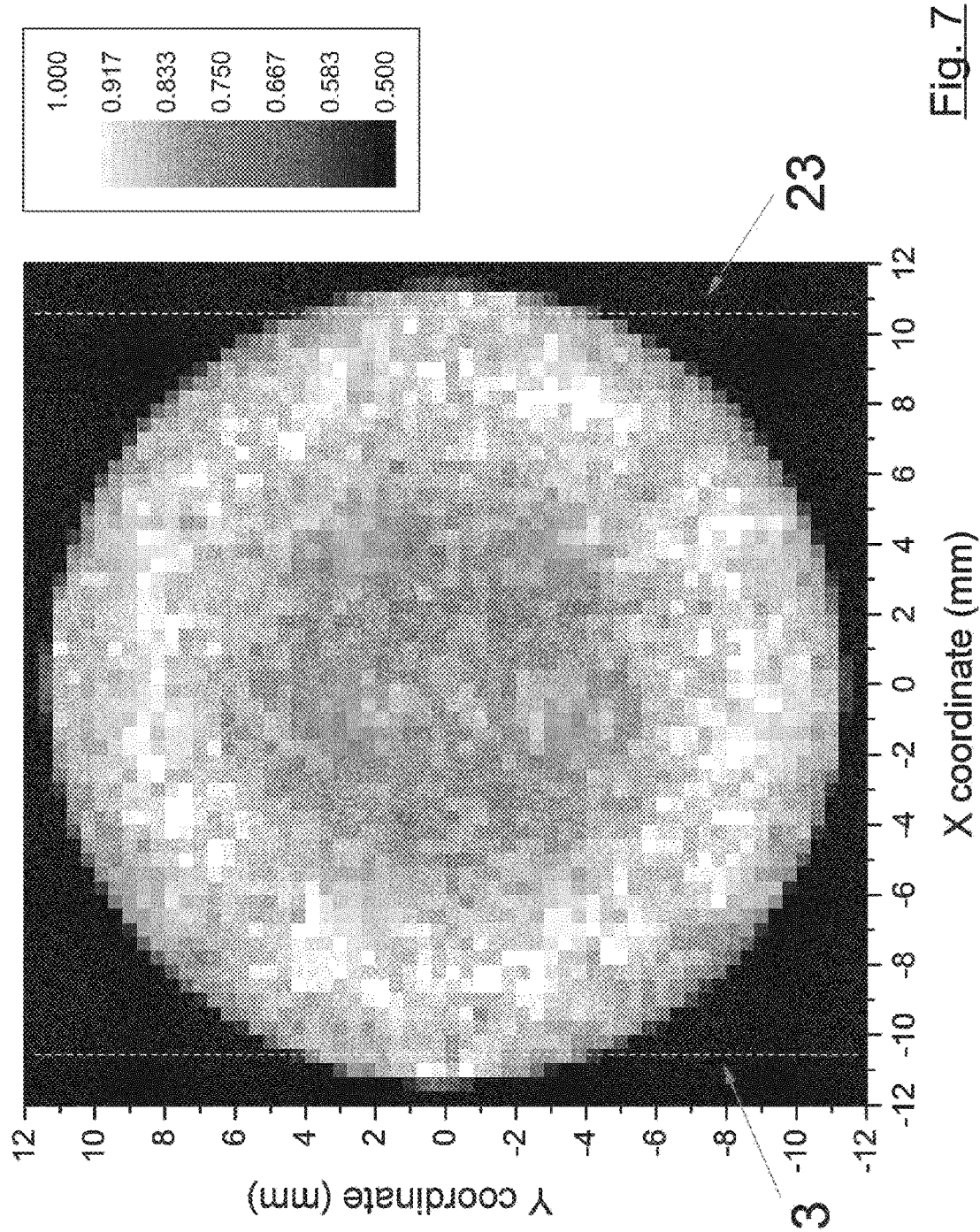
FIG. 7 depicts the normalized irradiance in the X and Y dimensions at the distal end of the device of FIG. 1.
Figure 8:
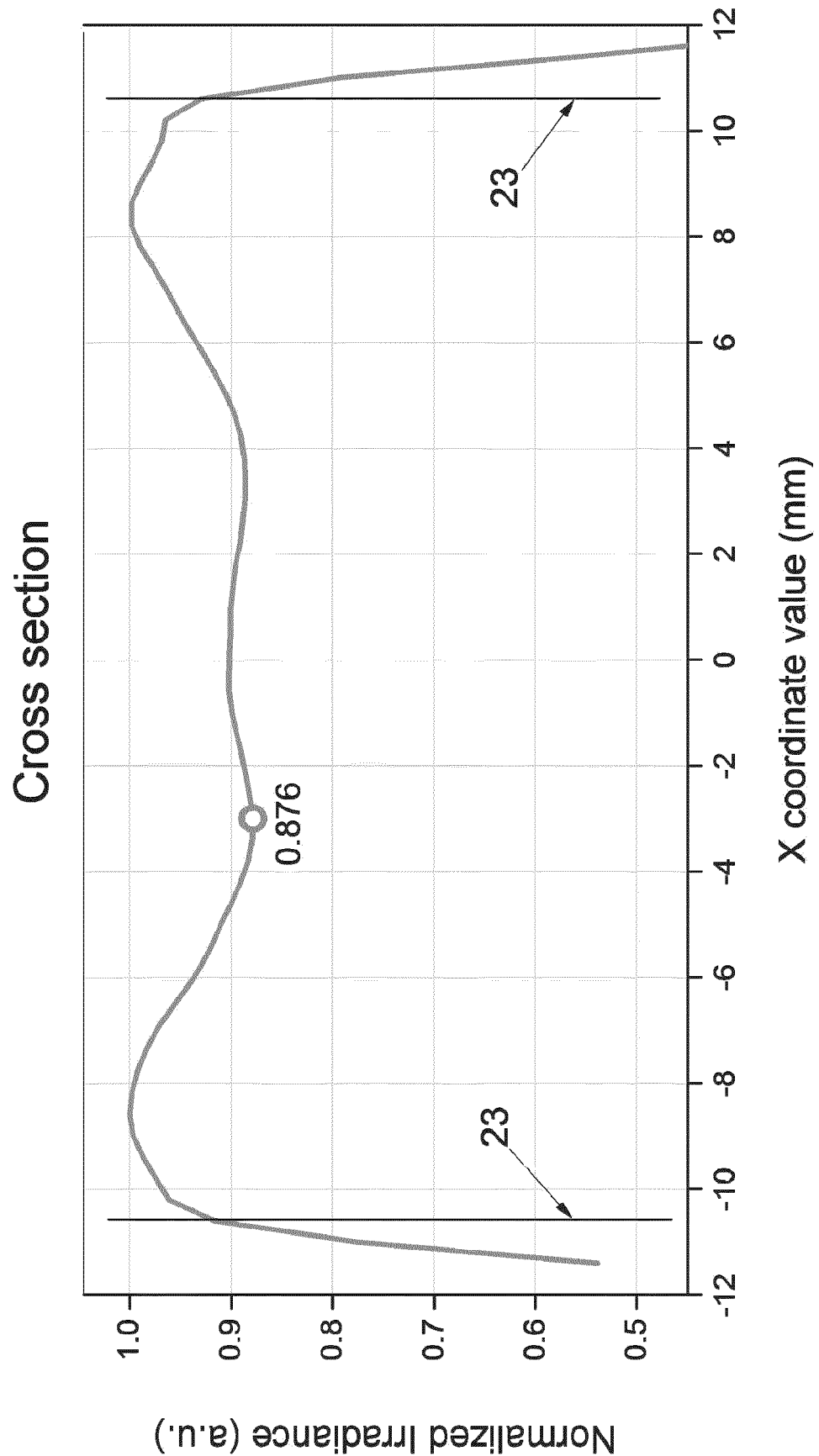
FIG. 8 represents a graph of cross section of normalized irradiance along the X axis at a central height, Y=0, of the device of FIG. 1.

The optimization process includes:
Varying the location of the variable points 21.
Obtaining the value of parameters relating to a selection criterion including at least one of power, overall efficiency, and homogeneity of the light received at a zone at the distal end 5b where the mark is placed. The homogeneity is calculated according to the following equation:

$$Homogeneity = \frac{Irr_{min}}{Irr_{max}} \times 100$$

where $Irr_{min}$ and $Irr_{max}$ are, respectively, the minimum and maximum irradiance measured within the illuminated area defined by the distal end 5b. The image of FIG. 7 represents the normalized irradiance obtained in the optimization process in the X and Y coordinates at the distal end 5b of the illumination device where lines 23 show the ends of the area delimited by distal end 5b. FIG. 8 depicts a graph of the normalized irradiance along the X axis at a central height (Y=0) for the illumination device of FIG. 6, showing an illumination homogeneity of 87.6%.

Selecting the variable points 21 that maximize a function which considers these parameters according to the selection criteria employed.
Some constraints may be employed in the optimization process; for instance, fixing a threshold for the minimum distance $d_{min}$ between the light source 3 and the reflector element 8. In an embodiment, the minimum distance $d_{min}$ is at least 0.5 mm to favor reflection to the external light reflector 5.

In order to generate a highly homogeneous light pattern at the distal end 5b, the different elements of the illumination device 1 (annular hollow body 2, light source 3, external light reflector 5 and reflector element 8) are arranged concentrically around the central axis 7 (axis of revolution). The light source 3 may be formed by a plurality of light emitting sources, preferably LEDs, arranged symmetrically around the annular hollow body 2. The LEDs may be disposed on a ring-shaped PCB 4 concentric to the lens to generate uniform light in the plane where the mark is located. The annular hollow body 2 is preferably made of a light absorbing material, such as black plastic or aluminum.

The present invention also refers to an optical system 10 for reading a marking on an object, such as the one shown in FIG. 2. The optical system 10 comprises, apart from the illumination device 1, a light field acquisition device disposed inside the annular hollow body 2. In an embodiment, the light field acquisition device comprises a main lens 11 and an image sensor 12 arranged in front of the main lens 11. The main lens 11 focuses light reflected back from the mark onto the image sensor 12. The optical system may be mounted on a widget attachable to a smartphone, or it may be mounted or integrated in a handheld reader.

Figure 9A:
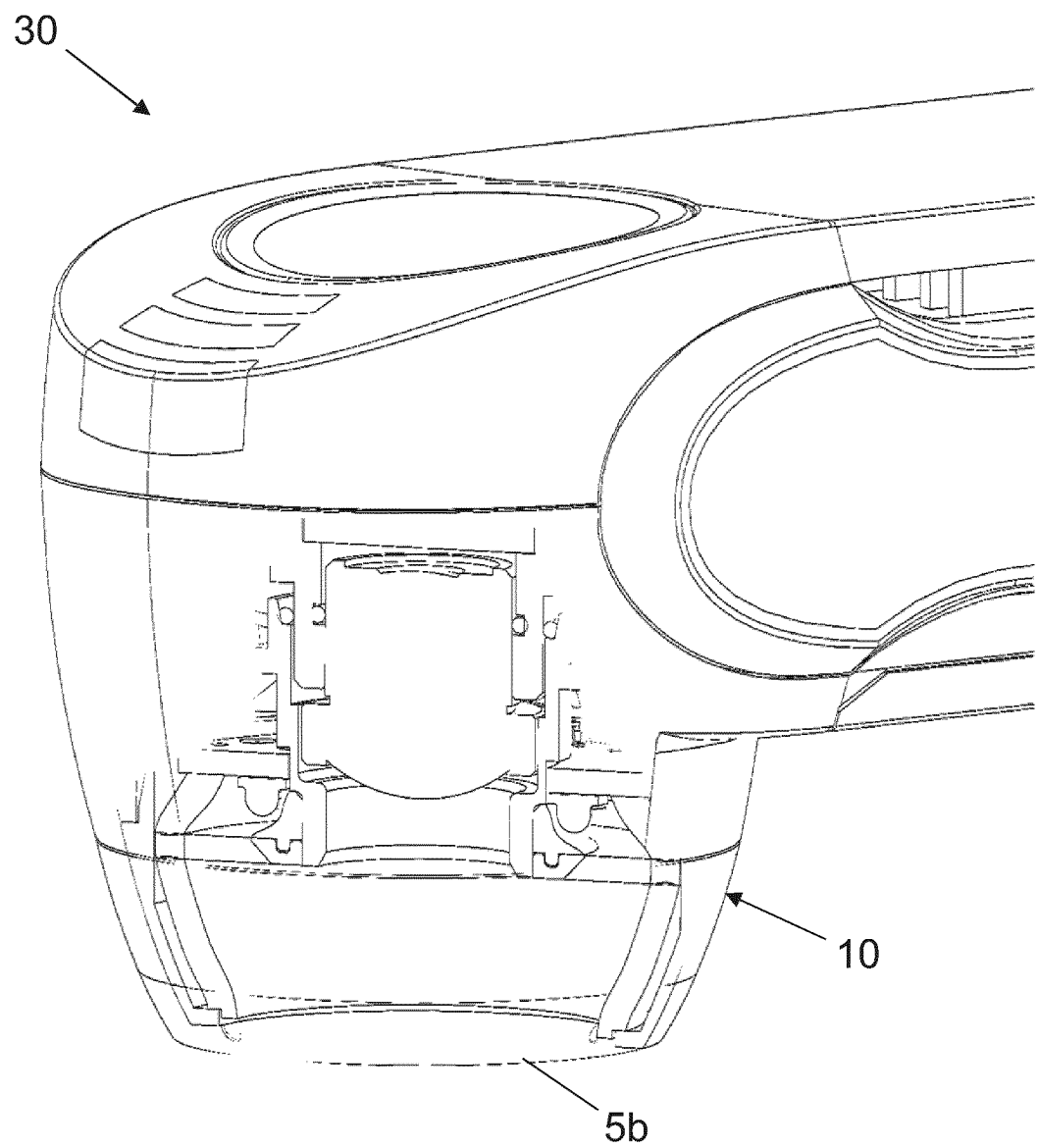
FIG. 9A depicts an optical system according to the present invention mounted on an end of an optical scanner.
Figure 9B:
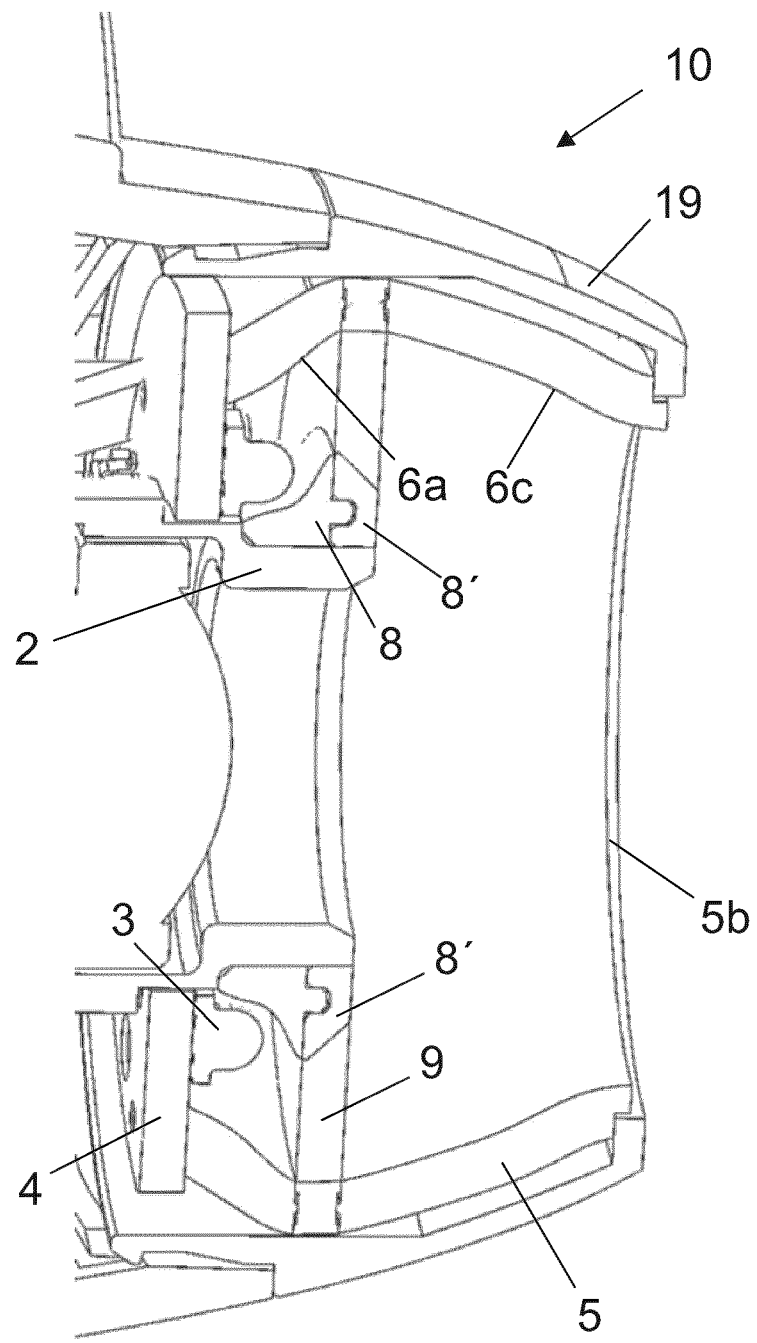
FIG. 9B shows a zoomed view of the optical system of FIG. 9A.

The present invention also relates to a reader apparatus for detecting a marking on an object. The apparatus, as shown in FIG. 9A, comprises an optical system 10 including the illumination device 1, and a processor for analyzing the image received from the optical system 10 to read, detect, decode and/or authenticate a mark. The apparatus may be a handheld reader, such as a smartphone or an optical scanner 30, as depicted in the example of FIG. 9A. The optical system 10 mounted on an end of the optical scanner 30 is illustrated in detail in FIG. 9B. The external light reflector 5 of the optical system 10 is attached to an external housing 19, which may be part of the optical system 10 itself or of the optical scanner 30.

The invention claimed is:
1. An illumination device for an optical system of a reader apparatus, the illumination device comprising:
an annular hollow body configured to receive a light field acquisition device;
a light source arranged externally around the annular hollow body; and
an external light reflector having a proximal end and a distal end, the external light reflector being configured to guide light originating from the light source to illuminate a zone at the distal end;
wherein the external light reflector is a hollow piece arranged concentrically to the annular hollow body and with an internal wall made of light reflective material, the internal wall being a surface of revolution having:
a first portion with increasing cross sections along a central axis from the proximal end to a first region with maximum cross section,
a second portion with decreasing cross sections from the first region to a second region with minimum cross section;
wherein the projection of the first portion on the central axis is shorter than the projection of the second portion on the central axis;
and in that the illumination device further comprises a reflector element having a mirror finish outer surface arranged in front of the light source and configured to redirect light originating from the light source towards the first portion of the internal wall of the external light reflector.

2. The illumination device of claim 1, further comprising a transparent layer disposed perpendicular to the central axis between the external light reflector and the annular hollow body.

3. The illumination device of claim 2, wherein the transparent layer is made of acrylic or polycarbonate.

4. The illumination device of claim 1, wherein the mirror finish outer surface is made of polished aluminum, polished silver, polished stainless steel or dense plastic with metal coating on surface.

5. The illumination device of claim 1, wherein the mirror finish outer surface of the reflector element is a surface of revolution arranged concentrically to the external light reflector.

6. The illumination device of claim 5, wherein the mirror finish outer surface has increasing cross sections along the central axis.

7. The illumination device of claim 5, wherein the mirror finish surface of the reflector element comprises at least one truncated conical surface.

8. The illumination device of claim 1, comprising a luminescence filter arranged inside the annular hollow body.

9. The illumination device of claim 1, wherein the reflector element is attached to the outer surface of the annular hollow body.

10. The illumination device of claim 1, wherein the internal wall of the external light reflector is made of a white plastic diffusive material.

11. The illumination device of claim 1, wherein the internal wall of the external light reflector is made of light scattering metal surface.

12. The illumination device of claim 1, wherein the annular hollow body is made of opaque material.

13. The illumination device of claim 1, wherein the light source comprises a plurality of light emitting sources arranged symmetrically around the annular hollow body.

14. The illumination device of claim 13, wherein the light emitting sources are LEDs.

15. The illumination device of claim 1, wherein the reflector element comprises an opaque light scattering layer disposed on the distal end of the reflector element.

16. An optical system for reading a marking on an object, the optical system comprising an illumination device according to claim 1, and a light field acquisition device disposed inside the annular hollow body.

17. An apparatus for detecting a marking on an object, comprising an optical system according to claim 16, and a processor configured to analyze the image received from the optical system to detect a marking.

* * * * *